United States Patent
Gerst et al.

(10) Patent No.: US 10,093,839 B2
(45) Date of Patent: *Oct. 9, 2018

(54) PRESSURE-SENSITIVE ADHESIVES COMPRISING LOW MOLECULAR WEIGHT ACID-FUNCTIONAL ACRYLIC RESINS AND METHODS OF MAKING AND USING SAME

(71) Applicant: BASF SE, Ludwigshafen (DE)

(72) Inventors: Matthias Gerst, Maikammer (DE); Michael Gross, Baunatal (DE); Rafael Galvan, Canton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,092

(22) Filed: Apr. 19, 2017

(65) Prior Publication Data

US 2017/0218235 A1    Aug. 3, 2017

Related U.S. Application Data

(63) Continuation of application No. 14/405,732, filed as application No. PCT/EP2013/061071 on May 29, 2013, now Pat. No. 9,657,204.

(60) Provisional application No. 61/655,164, filed on Jun. 4, 2012.

(51) Int. Cl.

| | | |
|---|---|---|
| *A01H 5/00* | (2018.01) | |
| *B32B 27/00* | (2006.01) | |
| *C08L 33/02* | (2006.01) | |
| *C08F 20/26* | (2006.01) | |
| *C09J 133/08* | (2006.01) | |
| *C09J 5/00* | (2006.01) | |
| *B32B 37/12* | (2006.01) | |

(52) U.S. Cl.
CPC ............. *C09J 133/08* (2013.01); *B32B 37/12* (2013.01); *C09J 5/00* (2013.01); *B32B 2037/1269* (2013.01); *B32B 2333/08* (2013.01); *C09J 2433/00* (2013.01)

(58) Field of Classification Search
CPC ........ C08F 2/06; C08F 220/14; C08F 220/06; C08F 2220/1825; C08F 2220/1858; C08F 2222/1013; C09J 133/02; C09J 2433/00; C09J 133/14; C08K 3/28; B32B 37/12; B32B 2333/08; B32B 2037/1269; C08L 33/08

USPC ...... 524/428; 156/332; 525/221; 526/318.42
See application file for complete search history.

(56) References Cited

U.S. PATENT DOCUMENTS

| | | | |
|---|---|---|---|
| 3,639,500 A * | 2/1972 | Muny et al. | ............... C09J 7/00 156/330 |
| 5,196,504 A | 3/1993 | Scholz et al. | |
| 5,461,103 A | 10/1995 | Bafford et al. | |
| 5,800,873 A | 9/1998 | Enthoven et al. | |
| 6,124,417 A | 9/2000 | Su | |
| 7,041,720 B2 | 5/2006 | Aydin et al. | |
| 7,262,242 B2 * | 8/2007 | Gielens | ..................... B32B 7/12 522/109 |
| 7,838,599 B2 | 11/2010 | Zollner et al. | |
| 2004/0235995 A1 * | 11/2004 | Aydin | .................... C09J 133/04 524/262 |
| 2005/0182186 A1 | 8/2005 | Gielens et al. | |
| 2008/0152841 A1 | 6/2008 | Choi et al. | |

FOREIGN PATENT DOCUMENTS

| | | |
|---|---|---|
| CN | 1429259 A | 7/2003 |
| WO | 2013117428 A1 | 8/2013 |

OTHER PUBLICATIONS

International Preliminary Report on Patentability of the International Searching Authority from related application PCT/EP2013/061071 dated Dec. 9, 2014.

International Search Report of the International Searching Authority from related application PCT/EP2013/061071 dated Nov. 9, 2013.

* cited by examiner

*Primary Examiner* — William K Cheung
(74) *Attorney, Agent, or Firm* — Meunier Carlin & Curfman LLC

(57) ABSTRACT

Disclosed herein are compositions comprising a first copolymer derived from monomers comprising a (meth)acrylate monomer, an acid monomer, and optionally at least one additional monomer selected from the group consisting of styrene, α-methyl-styrene, vinyl toluene, and mixtures thereof, wherein the first copolymer is derived in the absence of a molecular weight regulator and wherein the first copolymer has a weight average molecular weight of less than 10,000 Daltons, and methods of making the same. The compositions and methods disclosed can be used, for instance, in pressure-sensitive adhesive applications.

22 Claims, No Drawings

PRESSURE-SENSITIVE ADHESIVES COMPRISING LOW MOLECULAR WEIGHT ACID-FUNCTIONAL ACRYLIC RESINS AND METHODS OF MAKING AND USING SAME

CROSS-REFERENCE TO RELATED APPLICATION

This application is a continuation of and claims priority to U.S. application Ser. No. 14/405,732, filed on Dec. 4, 2014, now issued as U.S. Pat. No. 9,657,204, which is a 35 U.S.C. § 371 national stage application of PCT Application No. PCT/EP2013/061071 filed on May 29, 2013, which claims benefit of U.S. Provisional Application No. 61/655,164, filed Jun. 4, 2012, the disclosures of which are hereby incorporated herein by reference in their entirety.

FIELD OF THE DISCLOSURE

The present disclosure relates generally to low molecular weight acrylic resins for use in a variety of applications including, but not limited to, pressure-sensitive adhesive applications, and methods of making the same.

BACKGROUND

Natural rosins can be used, for instance, as tackifiers in pressure-sensitive adhesive applications, where they increase the stickiness of the adhesive. However, the high price and limited supply of natural rosins drives the need to decrease the dependency on natural rosins. Accordingly, finding a suitable substitution—even a partial substitution—would prove beneficial.

SUMMARY OF THE DISCLOSURE

Disclosed herein are compositions comprising a first copolymer derived from monomers comprising a (meth) acrylate monomer, an acid monomer, and optionally an additional monomer selected from the group consisting of styrene, α-methylstyrene, vinyl toluene, and mixtures thereof, wherein the first copolymer is derived in the absence of a molecular weight regulator and wherein the first copolymer has a weight average molecular weight of less than 10,000 Daltons. In some embodiments, the composition further comprises a second copolymer. A coating comprising the compositions described herein is also disclosed. Labels, films, and tapes comprising the composition are also provided. In some embodiments, the composition comprises an aqueous medium, which can optionally include ammonia. A pressure-sensitive adhesive can be prepared using the composition by applying the composition to a surface and drying it.

Further disclosed are methods for making a copolymer comprising polymerizing monomers including a (meth)acrylate monomer, an acid monomer, and optionally styrene in the absence of a molecular weight regulator at a polymerization temperature of at least 150° C. to produce a first copolymer having a weight average molecular weight of less than 10,000 Daltons. In some embodiments, the polymerizing step comprises mass polymerizing the monomers to produce the first copolymer. In some embodiments, the methods further comprise the step of mixing the first copolymer with a second copolymer to produce a copolymer blend. The compositions and methods disclosed can be used, for instance, in pressure-sensitive adhesive applications.

The details of one or more embodiments are set forth in the description below. Other features, objects, and advantages will be apparent from the description and from the claims.

DETAILED DESCRIPTION

Disclosed herein are compositions comprising a first copolymer derived from monomers comprising a (meth) acrylate monomer, an acid monomer, and optionally an additional monomer selected from the group consisting of styrene, α-methylstyrene, vinyl toluene, and mixtures thereof, wherein the first copolymer is derived in the absence of a molecular weight regulator and wherein the first copolymer has a weight average molecular weight of less than 10,000 Daltons. Polymer compositions, coating formulations, and methods for their preparation and use are disclosed herein.

The first copolymer described herein can he derived from 55% by weight or greater of one or more (meth)acrylate monomers (e.g., 65% by weight or greater, 75% by weight greater, 88% by weight or greater, 85% by weight or greater, 90% by weight or greater, 91% by weight or greater, 92% by weight or greater, 93% by weight or greater, 94% by weight or greater, 95% by weight or greater, 96% by weight or greater, 97% by weight or greater, 98% by weight or greater, or 99% by weight or greater of the (meth)acrylate monomer) based on the total weight of monomers. As used herein, the term "(meth)acrylate monomer" includes acrylate, methacrylate, diacrylate, and dimethacrylate monomers. In some embodiments, the (meth)acrylate monomer can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols).

Exemplary (meth)actylate monomers include, but are not limited to, methyl (meth)acrylate, ethyl (meth)acrylate, butyl (meth)acrylate, isobutyl (meth)acrylate, n-hexyl (meth)acrylate, ethylhexyl (meth)acrylate, n-heptyl (meth) acrylate, ethyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth) acrylate, isodecyl (meth)acrylate, dodecyl (meth)acrylate, lauryl (meth)acrylate, tridecyl (meth)acrylate, stearyl (meth) acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth)acrylate, 2-ethylhexyl (meth)acrylate, 2-propylheptyl (meth)acrylate, 2-phenoxyethyl (meth)acrylate, isobornyl (meth)acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth)acrylate, 3,4-epoxycyelohexylmethyl (meth)acrylate, 1,6 hexanediol di(meth)acrylate, 1,4 butanediol di(meth)acrylate and mixtures thereof. In some embodiments, the first copolymer is derived from two or more or three or more (meth)acrylate monomers. In some embodiments, the first copolymer is derived from at least two (meth)acrylate monomers, wherein at least one of the (meth)acrylate monomers has a $T_g$ for its corresponding homopolymer of 80° C. or greater (e.g., 90° C. or greater, 100° C. or greater, or 105° C. or greater) (e.g., methyl methacrylate) and at least one of the (meth)acrylate monomers has a $T_g$ for its corresponding homopolymer of 0° C. or less (e.g., −10° C. or less, −20° C. or less, −30° C. or less, −40° C. or less, or −50° C. or less) (e.g., butyl acrylate and/or 2-ethyl hexyl acrylate). In some embodiments, the first copolymer is derived from (meth)acrylate monomers selected from butyl acrylate, methyl methacrylate, 2-ethyl hexyl acrylate, 1,6 hexane diol diacrylate, and mixtures thereof.

The first copolymer can optionally be further derived with up to 5% by weight of an additional acrylic-based monomer. Exemplary acrylic-based monomers include, but are not limited to, (meth)acrylamide, (meth)acrylonitrile, diacetone (meth)acrylamide, n-methylol (meth)acrylamide, ureido (meth)acrylate, and mixtures thereof.

The first copolymer disclosed herein can be further derived from a vinyl aromatic monomer selected from the group consisting of styrene, α-methylstyrene vinyl toluene and mixtures thereof. In some embodiments, the first copolymer is derived from the vinyl aromatic monomer in an amount from 0% to 60%. For example, the first copolymer can be derived from greater than 5%, greater than 10%, greater than 15%, greater than 20%, greater than 25%, greater than 30%, greater than 35%, greater than 40%, or greater than 45% by weight of the vinyl aromatic monomer based on the total weight of the monomers, or less than 55%, less than 50%, less than 45%, less than 40%, less than 35%, less than 30%, less than 25%, less than 20%, less than 15%, less than 10%, or less than 5% by weight of the vinyl aromatic monomer based on the total weight of the monomers. In some embodiments, the vinyl aromatic monomer can be used in place or a portion or all of the at least one (meth)acrylate monomer having a homopolymer $T_g$ of 80° C. or greater.

The first copolymer can be further derived from an acid monomer. In some embodiments, the first copolymer is derived from the acid monomer in an amount of 0% to 15% by weight of the acid monomer (e.g., greater than 1% by weight, greater than 2% by weight, greater than 3% by weight, greater than 4% by weight, greater than 5% by weight, greater than 6% by weight, greater than 7% by weight, greater than 8% by weight, greater than 9% by weight, or greater than 10% by weight of the acid monomer, or less than 15%, less than 13%, less than 11%, less than 9%, less than 7%, less than 5%, less than 3%, or less than 1% by weight of the acid monomer), based on the total weight of the monomers. Exemplary acid monomers include, but are not limited to, α,β-monoethylenically unsaturated mono- and dicarboxylic acids such as acrylic acid, methacrylic acid, itaconic acid, crotonic acid, dimethacrylic acid, ethylacrylic acid, allylacetic acid, vinylacetic acid, maleic acid, fumaric acid, mesaconic acid, methylenemalonic acid, citraconic acid, and mixtures thereof. In some embodiments, the acid monomers for use in the first copolymer described herein are selected from the group consisting of acrylic acid, methacrylic acid, itaconic acid, phosphoethyl (meth)acrylate, acryl amido 2-methylpropane sulfonic acid (AMPS), vinyl sulfonic acid, and vinyl sulfonate.

The amount of the acid functionality in the first copolymer can be described by the acid number, which is a measure of the amount of carboxylic acid groups. The acid number is the mass (in milligrams) of potassium hydroxide required to neutralize one gram of the chemical compound or mixture of compounds. The acid number can be measured by any suitable titration method used by those of ordinary skill in the art. In some embodiments, the acid number of the first copolymer can be from 35 to 85 (e.g. from 35 to 45, from 45 to 55, from 55 to 65, from 65 to 75, or from 75 to 85). In some embodiments, the acid number of the first copolymer is 85 or less (e.g., 65 or less, or 45 or less).

The first copolymer described herein has a low weight average molecular weight. For instance, the first copolymer described herein can have a weight average molecular weight of less than 10,000 Daltons (e.g., less than 9,500 Daltons; less than 9,000 Daltons; less than 8,500 Daltons; or less than 8,000 Daltons). In some embodiments, the first copolymer described herein has a weight average molecular weight of from 1,500 Daltons to 9,000 Daltons. In some embodiments, the first copolymer described herein has a weight average molecular weight of from 2,000 Daltons to 7,000 Daltons.

The first copolymer can have both a theoretical glass-transition temperature ($T_g$) and a measured $T_g$. The theoretical $T_g$ is calculated using the Fox Equation. The measured $T_g$ is measured using the midpoint temperature using differential scanning calorimetry (DSC) as described, e.g., in ASTM 3418/82. In some embodiments, the theoretical $T_g$ is higher than the measured $T_g$. Without wishing to be bound to theory, the inventors believe the measured $T_g$ is lower than the theoretical $T_g$ because the molecular weight of the first copolymer (i.e., less than 10,000 Daltons) influences the measured $T_g$. The Fox Equation assumes infinite molecular weight of the resulting copolymer. In some embodiments, the first copolymer has a measured $T_g$ of less than 50° C. (e.g., less than 40° C., less than 30° C., less than 20° C., less than 10° C., less than 0° C., less than −10° C., less than −20° C., less than −30° C., less than −40° C., less than −50° C., or less than −60° C.). In some embodiments, the first copolymer has a measured $T_g$, of from −100° C. to 50° C. (e.g., from −70° C. to 20° C., from −50° C. to 10° C., or from −40° C. to 0° C.). In some embodiments, the first copolymer has a theoretical $T_g$ of greater than −30° C. (e.g., greater than −20° C., greater than −10° C., or greater than 0° C.). Unless otherwise specified, the $T_g$ as mentioned herein refers to the measured $T_g$.

The first copolymer can be manufactured according to any high temperature polymerization process known in the art. Such high temperature polymerization processes include, but are not limited to, mass polymerization, and mass-suspension polymerization. In some embodiments, the polymerization step is a mass (or bulk) polymerization. The first copolymer can be produced by continuously charging into a reactor the mixture of monomers, optionally a polymerization initiator, and optionally a reaction solvent. The polymerization temperature can be at least 150° C. In some embodiments, the polymerization temperature is at least 165° C. (e.g., at least 180° C., at least 195° C., or at least 210° C.). The residence time can be any amount of time sufficient to produce a polymer with desired properties (e.g., acid value and glass transition temperature) as well as resin weight average molecular weight (Mw). In some embodiments, the reaction (residence) time is from 5 to 30 minutes (e.g., 7-25 minutes, 9-20 minutes, or 11-15 minutes). The reaction mixture can be continuously withdrawn from the reactor and the resulting copolymer isolated by using devolatilizing equipment operating at a reduced pressure (i.e., vacuum). The reaction can be conducted in any suitable reactor that can be used for polymerization. Exemplary reactors that can be used include, but are not limited to, continuously agitated tank reactors, tubular reactors, loop reactors, or reactive extruders.

The first copolymer can further be combined with a second copolymer to form a copolymer blend. In some embodiments, the second copolymer includes an adhesive polymer such as an acrylic copolymer, a styrene acrylic copolymer, or a styrene-butadiene copolymer. Exemplary primary monomers for the adhesive polymer include, but are not limited to, esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols) such as 2-ethylhexyl acrylate, n-butyl acrylate, ethyl acrylate, and mixtures thereof; and butadiene (in the case of styrene-butadiene copolymers). Exemplary co-monomers include, but are not limited to, styrene, vinyl acetates, hydroxyalkyl acrylates, esters of α,β-monoethylenically unsaturated monocarboxylic and dicarboxylic acids as described above (e.g., methyl (meth)acrylate acid monomers such as (meth)acrylic acid, (meth)acrylamide, (meth)acrylonitrile, optional additional monomers, and mixtures thereof.

The second copolymer can have both a theoretical $T_g$ and a measured $T_g$. The theoretical $T_g$ is calculated using the Fox Equation. The measured $T_g$ is measured using the midpoint temperature using differential scanning calorimetry (DSC) as described, e.g., in ASTM 3418/82. For pressure-sensitive adhesive applications, the monomer composition of the adhesive polymer is often chosen such that the measured $T_g$ of the polymer composition is less than 0° C., for example, less than −10° C. less than −20° C., less than −30° C., or less than −40° C. In some embodiments, the monomers or polymers can be provided in the form of aqueous polymer dispersions and can include surfactants, protective colloids, and the like, as would be understood by those of skill in the art. The solids content can range from, for example, 50% to 70%. Suitable commercially available acrylate-based copolymer dispersions include, but are not limited to, certain BASF SE products sold under the brand name ACRONAL® (e.g., ACRONAL® V215, ACRONAL® V210, or ACRONAL® A220, all of which are acrylic copolymer dispersions having a measured $T_g$ of from about −45° C. to about −40° C.). Suitable commercially available styrene/butadiene-based adhesive copolymer dispersions include, but are not limited to, certain BASF SE products sold under the brand name BUTOFAN® (e.g., BUTOFAN® NS 166, a styrene-butadiene copolymer dispersion having a measured $T_g$ of about −40° C.).

In some embodiments, the second copolymer has a measured $T_g$ of less than 0° C. (e.g., less than −10° C., less than −20° C., less than −30° C., less than −40° C., less than −50° C., or less than −60° C.). In some embodiments, the measured $T_g$ of the first copolymer is higher than the measured $T_g$ of the second copolymer. For example, the first copolymer can have a measured $T_g$ that is 5° C. or greater, 10° C. or greater, 15° C. or greater, 20° C. or greater, 25° C. or greater, 30° C. or greater, 35° C. or greater, 40° C. or greater, 45° C. or greater, or 50° C. or greater than the measured $T_g$ of the second copolymer.

In some embodiments, a polymer composition (e.g., a pressure-sensitive adhesive) including the first copolymer and the second copolymer is provided such that the second copolymer is present in an amount of from 50% to 95% (e.g., from 60% to 95%, or from 70% to 90%) by weight of the total amount of the first copolymer and the second copolymer.

In some embodiments, a base is added to the first copolymer or to a polymer composition including the first copolymer to neutralize the acid groups or at least a portion of the acid groups present in the first copolymer. For example, the base can be provided in an aqueous medium and the first copolymer can be added to the base in the aqueous medium. As a result, the first copolymer can be dissolved in the aqueous medium to produce a solution or can be finely dispersed in the aqueous medium to form a dispersion. The at least partially neutralized first copolymer in the aqueous medium can then be combined with the second copolymer, which can be provided as an aqueous dispersion. Exemplary bases include, but are not limited to, sodium hydroxide, ammonia (ammonium hydroxide), or an alkanol amine (e.g., triethanol amine). In some embodiments, a sufficient amount of the base (e.g., ammonia) is added in an amount greater than the amount necessary to neutralize the acid groups present in the first copolymer. For example, the base can be provided in an amount of 105% or more, 110% or more, or 115% or more than the amount necessary to neutralize the acid groups present in the first copolymer. In some embodiments, the degree of neutralization of the first copolymer is less than 100% (e.g., less than 80%, less than 60%, less than 40%, or less than 20%). In some embodiments, the base is added to the first copolymer or a polymer composition including the first copolymer until the pH is from 6 to 9 (e.g., from 6.5 to 8.5, from 7 to 8).

Coatings can be made from the polymer compositions disclosed herein. For example, the first copolymer can be at least partially neutralized and combined with the optional second copolymer and one or more additives to form a coating composition. Exemplary additives include, but are not limited to, thickeners, wetting aids, defoamers, tackifiers, crosslinkers (e.g., metal salts or silane coupling agents such as glycidoxyalkyl alkoxylsilanes), fillers (e.g., chalk or calcium carbonate), pigments, dyes, or mixtures thereof. The coatings made from the coating composition can be used in a variety of applications, such as adhesive applications (e.g., as pressure-sensitive adhesives or flooring adhesives). The coating can be applied to a surface and dried to produce a pressure-sensitive adhesive coating.

Exemplary tackifiers (tackifying resins) include, but are not limited to, natural resins, such as rosins and their derivatives formed by disproportion or isomerization, polymerization, dimerization and/or hydrogenation. In some embodiments, the tackifying resins can be present in salt form (with, for example, monovalent or polyvalent counterions (cations)) or in esterified form. Alcohols used for the esterification can be monohydric or polyhydric. Exemplary alcohols include, but are not limited to, methanol, ethanediol, diethylene glycol, triethylene glycol, 1,2,3-propanethiol, and pentaerythritol.

Exemplary hydrocarbon tackifying resins include, but are not limited to, coumarone-indene resins, polyterpene resins, and hydrocarbon resins based on saturated CH compounds such as butadiene, pentene, methylbutene, isoprene, pipetylene, divinylmethane, pentadiene, cyclopentene, cyclopentadiene, cyclohexadiene, styrene, a-methylstyrene, and vinyltoluene.

In some embodiments, the tackifying resins are derived from natural rosins. In some embodiments, the tackifying resins are chemically modified rosins. In some embodiments, the rosins comprise abietic acid or abietic acid derivatives.

Exemplary wetting aids include, but are not limited to, fatty alcohol ethoxylates, alkylphenol ethoxylates, sulfosuccinic acid and its alkyl esters, nonylphenol ethoxylates, polyoxyethylenes/-propylenes or sodium dodecylsulfonates. In some embodiments, the wetting aid is present in an amount of 0.05 parts by weight to 5 parts by weight (e.g., 0.1 to 3 parts by weight) per 100 parts by weight of polymer (solids). Suitable commercially available wetting aids include, but are not limited to, BASF SE products sold under the brand name LUMITEN® (e.g., LUMITEN® I-SC).

Pressure-sensitive adhesives made from the coatings disclosed herein can be used in various articles of manufacture including, but not limited to, labels, sheets, or tapes. The pressure-sensitive adhesive can be applied directly or indirectly (by the transfer method) to a substrate by means of common coating techniques including, but not limited to, rolling, knife coating, or spreading. Exemplary substrates include, but are not limited to, paper or polymer films such as those comprising polyethylene, polypropylene, polyethylene terephthalate, polyvinyl chloride, polystyrene, polyamide, or metal. The water can be removed, for example, by drying at 50-150° C. In some embodiments, the pressure-sensitive adhesive is applied to paper labels. Before or after the adhesive has been applied, the substrates can be cut to give tapes, labels, or sheets. For later use, the coated side of the substrates can be lined with a release paper (e.g., siliconized paper).

The self-adhesive articles using the low molecular weight acrylic resins of the present disclosure can have comparative properties to self-adhesive articles prepared solely from natural rosin-based tackifiers including, but not limited to, similar or improved adhesion and cohesion. Comparable properties can be obtained even when the dispersions or pressure-sensitive adhesives comprise additives such as wetting aids.

Shear strength is a measure of cohesion, and can be ascertained by the method described in Finat Test Method (FTM) No. 8. In some embodiments, the shear strength of the coating formulation disclosed herein is comparable to or better than that of a coating formulation prepared solely from natural rosin-based tackifiers. In some embodiments, the shear strength of the coating formulation disclosed herein is at least 4 hours (e.g., at least 10 hours, at least 20 hours, at least 30 hours, or at least 40 hours), which measures the time it takes the bond created by the adhesive to break under the test conditions described in FTM No, 8. For example, the shear strength can be from 4 hours to 150 hours. The longer the period of time until the bond breaks, the greater the measure of shear strength, which is in turn a measure of cohesion.

Peel strength is a measure of adhesion, and can be ascertained by the method described in Finat Test Method (FTM) No. 1. Peel strength can be measured at different contact time intervals. In some embodiments, the peel strength is measured after one minute (e.g., after 1 minute, after 20 minutes, or after 24 hours). In some embodiments, the peel strength of the coating formulation disclosed herein is comparable to or better than that of a coating formulation prepared solely from natural rosin-based tackifiers. In some embodiments, the peel strength of the coating formulation disclosed herein after one minute of contact time is at least 3.5 Newtons per 2.5 cm (e.g., at least 4 N/2.5 cm, at least 5 N/2.5 cm, 6 N/2.5 cm, at least 8 N/2.5 cm, at least 9 N/2.5 cm, at least 10 N/2.5 cm, at least 11 N/2.5 cm, or at least 12 N/2.5 cm), which measures the force required to peel a strip treated with the coating formulation from a test panel under conditions described in FTM No. 1. For example, the peel strength of the coating formulation disclosed herein after one minute of contact time can be from 3.5 N/2.5 cm to 13.5 N/2.5 cm. The higher the peel strength value, the higher the adhesion. In some embodiments, the peel strength of the coating formulation disclosed herein after twenty minutes of contact time is at least 3.5 N/2.5 cm (e.g., at least 4 N/2.5 cm, at least 6 N/2.5 cm, 8 N/2.5 cm, at least 10 N/2.5 cm, at least 12 N/2.5 cm, or at least 14 N/2.5 cm). For example, the peel strength of the coating formulation disclosed herein after one minute of contact time can be from 5 N/2.5 cm to 18 N/2.5 cm.

Loop tack measurements measures the coating formulation's tack, or the force of attraction between the surface of the adhesive and the substrate. The loop tack measurement can be ascertained by the method described in Finat Test Method (FTM) No. 9. The higher the loop tack measurement, the greater the tack of the material. In some embodiments, the tack of the coating formulation disclosed herein is comparable to or better than that of a coating formulation prepared solely from natural rosin-based tackifiers. In some embodiments, the coating formulation disclosed herein has a loop tack measurement of at least 1.5 N/2.5 cm (e.g., at least 2.5 N/2.5 cm, at least 3 N/2.5 cm, at least 3.5 N/2.5 cm, at least 4 N/2.5 cm, at least 4.5 N/2.5 cm, or at least 5 N/2.5 cm). For example, the loop tack measurement can be from 1.5 N/2.5 cm to 6.5 N12.5 cm.

Other than in the examples, or where otherwise noted, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

By way of non-limiting illustration, examples of certain embodiments of the present disclosure are given below.

EXAMPLES

Acid Functional (Styrene) Acrylic Resin Synthesis

The first copolymer was produced by continuously charging into a reactor a mixture of monomers (acrylic acid, butyl acrylate, methyl methacrylate, 2-ethyl hexyl acrylate, styrene, and/or 1,6-hexane diol diacrylate), a polymerization initiator (di-tertiary butyl peroxide); and a reaction solvent (isopropanol). The reaction mixture was maintained at a polymerization temperature as set forth in Table 1 for the residence time provided. The reaction mixture was continuously withdrawn from the reactor and the resulting polymer was isolated by using devolatilizing equipment operated at reduced pressure (i.e., vacuum). The measured $T_g$ values reported in Table 1 were determined by DSC. The polymer components are provided on a weight basis.

TABLE 1

Overall Characteristics of the Resins Used in the First Copolymer of Samples A-R

| Sample | A | B | C | D | E | F | G |
|---|---|---|---|---|---|---|---|
| Acrylic Acid | 5.0 | 5.0 | 5.0 | 10.0 | 10.0 | 10.0 | 4.3 |
| Butyl Acrylate | 50.0 | 50.0 | 50.0 | 45.0 | 45.0 | 45.0 | 80.3 |

TABLE 1-continued

Overall Characteristics of the Resins Used in the First Copolymer of Samples A-R

| | | | | | | | |
|---|---|---|---|---|---|---|---|
| Methyl Methacrylate | 35.0 | 35.0 | 35.0 | 35.0 | 35.0 | 35.0 | 0.0 |
| 1,6 Hexane diol diacrylate | 0.0 | 0.0 | 0.0 | 0.0 | 0.0 | 0.0 | 5.4 |
| Isopropanol | 8.0 | 8.0 | 8.0 | 8.0 | 8.0 | 8.0 | 8.0 |
| Di-tertiary butyl peroxide | 2.0 | 2.0 | 2.0 | 2.0 | 2.0 | 2.0 | 1.0 |
| Reaction Temperature (° C.) | 190 | 200 | 210 | 190 | 200 | 210 | 215** |
| Residence time (min.) | 12 | 12 | 12 | 12 | 12 | 12 | 12** |
| Weight Average Molecular Weight | 4867 | 3991 | 3199 | 4891 | 3985 | 2794 | 5930 |
| % Non-volatiles | 98.1 | 97.8 | 97.1 | 98.7 | 97.8 | 97.5 | 96.6 |
| Measured $T_g$ (° C.) | −10.2 | −17.5 | −21.9 | 0.5 | −0.6 | 2.5 | −60.3 |
| Acid Number | 40.6 | 40.5 | 40.5 | 79.9 | 79.7 | 79.9 | 36.6 |

| Sample | H | I | J | K | L | M | N | O | P | Q | R |
|---|---|---|---|---|---|---|---|---|---|---|---|
| 2-Ethyl hexyl acrylate | 0.0 | 0.0 | 11.1 | 0.0 | 27.8 | 27.8 | 55.6 | 55.6 | 0.0 | 0.0 | 0.0 |
| Acrylic acid | 5.6 | 11.1 | 11.1 | 5.6 | 5.6 | 5.6 | 5.6 | 5.6 | 5.6 | 5.6 | 5.6 |
| Butyl acrylate | 55.6 | 61.1 | 61.1 | 66.7 | 27.8 | 27.8 | 0.0 | 0.0 | 55.6 | 55.6 | 61.1 |
| Methyl methacrylate | 38.9 | 27.8 | 16.7 | 27.8 | 38.9 | 38.9 | 38.9 | 38.9 | 22.2 | 0.0 | 30.0 |
| Styrene | 0.0 | 0.0 | 0.0 | 0.0 | 0.0 | 0.0 | 0,0 | 0.0 | 16.7 | 38.9 | 0.0 |
| 1,6 Hexane diol diacrylate | 0.0 | 0.0 | 0.0 | 0.0 | 0.0 | 0.0 | 0.0 | 0.0 | 0.0 | 0.0 | 3.3 |
| Isopropanol | 8.0 | 8.0 | 8.0 | 8.0 | 8.0 | 8,0 | 8.0 | 8.0 | 8,0 | 8.0 | 8,0 |
| Di-tertiary butyl peroxide | 2.0 | 2.0 | 2.0 | 2.0 | 2.0 | 2.0 | 2.0 | 2.0 | 2.0 | 2.0 | 2.0 |
| Reaction Temperature (° C.) | 200 | 200 | 200 | 200 | 200 | 195 | 190 | 185 | 200 | 205 | 215 |
| Residence time (min.) | 12 | 12 | 12 | 12 | 12 | 12 | 12 | 12 | 12 | 12 | 12 |
| Number Average Molecular Weight | 1809 | 1967 | 1919 | 1797 | 1713 | 1783 | 2181 | 2373 | 2046 | 2434 | 1736 |
| Weight Average Molecular Weight | 4073 | 4610 | 5608 | 4551 | 3734 | 4151 | 5185 | 6287 | 5213 | 6585 | 5278 |
| % non-vols | 97.5 | 97.9 | 97.5 | 97.5 | 97.1 | 97.0 | 96,9 | 97.1 | 97.6 | 98.1 | 96.3 |
| Measured $T_g$ (° C.) | −17 | −12 | −25 | −28 | 23 | −18 | −24 | −20 | −9 | 6 | −23 |
| Acid Number | 423 | 81.4 | 78.4 | 397 | 40.9 | 41.1 | 41.8 | 40.7 | 40.4 | 39.3 | 40.7 |

**The inventors believe the reaction temperature was 215° C. and the residence time was 12 minutes for Sample G Adhesive Preparation The adhesives in Examples 1-20 were prepared in the same manner. The (styrene) acrylic resins described in Table 1 were heated for 1 hour in a drying oven at 100° C. to ensure low viscosity and transferred into a vessel that had been preheated to 80° C. A calculated amount of aqueous ammonia solution was added, under continuous stirring, in 30 minutes. The amount of ammonia was calculated for each resin to neutralize its acrylic acid content to 110% resulting in a pH value of 7.5-8. Finally, the second copolymer (e.g., ACRONAL® V215 adhesive copolymer dispersion) was added to the first copolymer or rosin-ester over one hour at 80° C. The blend product had a dry weight ratio of second copolymer:first copolymer or rosin-ester of 80:20 and a solids content of about 55%. Example 19 includes only the second copolymer, without addition of the first copolymer or rosin ester. Table 2 shows the formulation for all the examples.

TABLE 2

Formulations for Examples 1-20

| Example | Second Copolymer | Dry Weight Ratio (s/s) | First Copolymer or Rosin-Ester | Additives (s/s) |
|---|---|---|---|---|
| 1 | ACRONAL ® V215 | 80:20 | B | N/A |
| 2 | ACRONAL ® V215 | 80:20 | A | N/A |
| 3 | ACRONAL ® V215 | 80:20 | F | N/A |
| 4 | ACRONAL ® V215 | 80:20 | F | N/A |
| 5 | ACRONAL ® V215 | 80:20 | D | N/A |

TABLE 2-continued

Formulations for Examples 1-20

| Example | Second Copolymer | Dry Weight Ratio (s/s) | First Copolymer or Rosin-Ester | Additives (s/s) |
|---|---|---|---|---|
| 6 | ACRONAL ® V215 | 80:20 | C | N/A |
| 7 | ACRONAL ® V215 | 80:20 | G | N/A |
| 8 | ACRONAL ® V215 | 80:20 | H | +0.5% LUMITEN ® I-SC |
| 9 | ACRONAL ® V215 | 80:20 | I | +0.5% LUMITEN ® I-SC |
| 10 | ACRONAL ® V215 | 80:20 | K | +0.5% LUMITEN ® I-SC |
| 11 | ACRONAL ® V215 | 80:20 | L | +0.5% LUMITEN ® I-SC |
| 12 | ACRONAL ® V215 | 80:20 | N | +0.5% LUMITEN ® I-SC |
| 13 | ACRONAL ® V215 | 80:20 | O | +0.5% LUMITEN ® I-SC |
| 14 | ACRONAL ® V215 | 80:20 | P | +0.5% LUMITEN ® I-SC |
| 15 | ACRONAL ® V215 | 80:20 | Q | +0.5% LUMITEN ® I-SC |
| 16 | ACRONAL ® V215 | 80:20 | R | +0.5% LUMITEN ® I-SC |
| 17 | ACRONAL ® V215 | 80:20 | M | +0.5% LUMITEN ® I-SC |
| 18 | ACRONAL ® V215 | 80:20 | J | +0.5% LUMITEN ® I-SC |
| 19 | ACRONAL ® V215 | N/A | N/A | +0.5% LUMITEN ® I-SC |
| 20 | ACRONAL ® V215 | 80:20 | rosin-ester | +0.5% LUMITEN ® I-SC |

Test Procedures and Performance Testing

After cooling to room temperature, the compositions prepared in Examples 1-20 were performance tested for their pressure-sensitive adhesive properties. Examples 8-20 were additionally formulated with 0.5% LUMITEN® I-SC (a sulfosuccinic ester wetting aid commercially available from BASF Corporation) before preparation of the test strips to ensure good coatability on siliconized paper. The procedures adopted for each Example are as follows.

Preparing the Test Strips

The compositions were applied using a coating bar in a thin layer to a commercial siliconized paper (LAUFENBERG SILIKONPAPIER NSA 1370) and dried in a drying oven at 90° C. for 3 minutes. The gap height of the coating bar was chosen to give an application of 18 g/m$^2$ for the dried polymer (i.e., pressure-sensitive adhesive). A laminate was obtained by placing non-primered paper label face stock material (HERMA ETIKETTENPAPIER 75 g/m$^2$) onto the dried polymer and rolling on firmly using a manual roller. The film laminate produced in this way was cut into strips 25 cm long and 2.5 cm wide. Before testing those strips were stored for at least 16 hours at 23° C. and 50% relative atmospheric humidity.

Testing of the Shear Strength

After the siliconized paper had been removed, the respective test strip was bonded to the edge of a stainless steel test panel to give a bond area of 6.25 cm$^2$. Ten minutes after bonding, a one-kilogram weight was fastened to the projecting end of the film and the metal test panel was suspended vertically in a chamber having a constant temperature of 23° C. and a relative atmospheric humidity of 50%. The time taken for the bond to break under the influence of the weight is a measure of the shear strength, which is in turn a measure of the cohesion. The longer the period of time until the bond breaks, the greater the cohesion. Three independent determinations were conducted for each polymer. The figures reported in Table 3 are mean values from those three determinations. The shear strength testing method used corresponds essentially to the Finat Test Method (FTM) No. 8, which is incorporated herein by reference. The test procedure used herein differed from FTM No. 8 in that a stainless steel test panel was used instead of glass (as suggested by FTM No. 8).

Testing of the Peel Strength

After the siliconized paper had been removed, a test strip was bonded to a cardboard test panel at 23° C. and 50% relative atmospheric humidity. Following the expiry of a predetermined contact time as indicated in Table 3, the strip was peeled from the test panel at an angle of 180° and a speed of 300 mm per minute using a tensile testing machine. The force required to do this is a measure of the adhesion. It is designated as peel strength and reported in Newtons per 2.5 cm (N/2.5 cm). The higher the peel strength value, the higher the adhesion. Two independent determinations were carried out for each polymer. The figures reported in Table 3 are mean values of the two determinations. The peel strength testing method corresponds essentially to the Finat Test Method (FTM) No. 1, which is incorporated herein by reference. The test procedure used herein differed from FTM No. 1 in that a cardboard test panel was used instead of glass (as suggested by FTM No. 1), the two repetitions were used instead of three repetitions (as suggested by FTM No. 1), and dwell times of 1 minute and 20 minutes were used instead of 20 minutes and 24 hours (as suggested by FTM No. 1).

Loop Tack Measurement

The loop tack measurements were made in a tensile machine. In this test, the adhesive coated label paper of dimension 25 cm×2.5 cm is formed into a loop, the coated side is contacted with the test surface (cardboard), and a measurement is made of the maximum force (N/2.5 cm) required for removal immediately after the contact is established. The figures reported in Table 3 are mean values of two independent determinations. The loop tack testing method corresponds essentially to the Finat Test Method (FTM) No. 9, which is incorporated herein by reference. The test procedure used herein differed from FTM No. 9 in that a cardboard test panel was used instead of glass (as suggested by FTM No. 9).

TABLE 3

Test Results for Examples 1-20

| Example | Loop tack [N/2.5 cm] | Shear strength [hrs] | Peel strength after 1 minute contact time [N/2.5 cm] | Peel strength after 20 minutes contact time [N/2.5 cm] |
|---|---|---|---|---|
| 1 | 4.3 | 66.3 | 7.7 | 10.2 |
| 2 | 3.8 | 138.0 | 5.7 | 8.1 |

TABLE 3-continued

Test Results for Examples 1-20

| Example | Loop tack [N/2.5 cm] | Shear strength [hrs] | Peel strength after 1 minute contact time [N/2.5 cm] | Peel strength after 20 minutes contact time [N/2.5 cm] |
|---|---|---|---|---|
| 3 | 3.9 | 39.7 | 11.2 | 14.0 |
| 4 | 2.5 | 53.5 | 10.4 | 16.2 |
| 5 | 1.8 | 92.2 | 5.5 | 7.6 |
| 6 | 4.6 | 73.1 | 11.1 | 15.5 |
| 7 | 2.9 | 4.5 | 4.1 | 5.3 |
| 8 | 4.0 | 40.5 | 11.5 | 14.2 |
| 9 | 5.1 | 43.9 | 11.1 | 13.7 |
| 10 | 5.0 | 17.4 | 10.8 | 13.4 |
| 11 | 5.3 | 23.7 | 11.9 | 14.3 |
| 12 | 5.2 | 26.2 | 12.2 | 14.1 |
| 13 | 4.5 | 25.4 | 10.8 | 14.1 |
| 14 | 3.5 | 57.3 | 11.2 | 13.4 |
| 15 | 1.7 | 76.8 | 6.9 | 8.7 |
| 16 | 4.2 | 24.7 | 11.8 | 14.7 |
| 17 | 4.6 | 30.1 | 17.7 | 14.4 |
| 18 | 5.3 | 25.9 | 11.7 | 14.2 |
| 19 | 5.6 | 73.4 | 5.7 | 14.3 |
| 20 | 5.9 | 47.9 | 12.5 | 14.2 |

The results shown in Table 3 demonstrate an advantage in short time peel strength for the formulations using the first copolymer when compared with a comparative formulation (Example 19) without the first copolymer. It is also demonstrated that the short time peel strength for many of the examples is comparable to, or in a few instances better than, the peel strength obtained using a rosin-based tackifier (Example 20). The ultimate peel strength reaches a value similar to adhesives prepared without the use of the tackifiers. This is true whether the tackifier used is the first copolymer described herein or a rosin-based tackifier.

It is also shown in Table 3, that the first copolymers described herein can impart well-balanced properties to the final pressure-sensitive adhesive formulations. Besides the high peel strength values at short contact times, the shear strength values of greater than 20 hours indicate good cohesion.

What is claimed is:

1. A pressure-sensitive adhesive, comprising:
   a first copolymer derived from monomers comprising a (meth)acrylate monomer and an acid monomer;
   wherein the first copolymer is polymerized at a temperature of at least 150° C., and
   wherein the first copolymer has a weight average molecular weight of from 2,000 to 7,000 Daltons.

2. The pressure-sensitive adhesive according to claim 1, wherein the first copolymer is derived from at least two methacrylate) monomers.

3. The pressure-sensitive adhesive according to claim 1, wherein the acid monomer includes acrylic acid, methacrylic acid, itaconic acid, or a mixture thereof.

4. The pressure-sensitive adhesive according to claim 1, wherein the first copolymer is further derived from at least one additional monomer selected from the group consisting of styrene, a-methyl styrene, vinyl toluene, and mixtures thereof.

5. The pressure-sensitive adhesive according to claim 1, wherein the first copolymer has an acid number of from 35 to 85.

6. The pressure-sensitive adhesive according to claim 1, wherein the first copolymer has a measured glass-transition temperature of from −70° C. to 20° C.

7. The pressure-sensitive adhesive according to claim 1, further comprising a second copolymer present in an amount of from 60% to 95% by weight of the total amount of the first copolymer and the second copolymer.

8. The pressure-sensitive adhesive according to claim 7, wherein the measured glass transition temperature of the first copolymer is higher than the measured glass transition temperature of the second copolymer.

9. The pressure-sensitive adhesive according to claim 7, wherein the measured glass transition temperature of the second copolymer is less than −20° C.

10. The pressure-sensitive adhesive according to claim 1, further comprising an aqueous medium, wherein the aqueous medium includes ammonia.

11. A label, film, or tape comprising the pressure-sensitive adhesive according to claim 1.

12. A method of making a pressure-sensitive adhesive of claim 1, comprising:
    polymerizing monomers including a (meth)acrylate monomer and an acid monomer at polymerization temperature of at least 150° C. to produce a first copolymer having a weight average molecular weight of from 2,000 to 7,000 Daltons; and
    preparing a pressure-sensitive adhesive from the first copolymer.

13. The method according to claim 12, wherein the polymerizing step comprises mass polymerizing the monomers to produce the first copolymer.

14. The method according to claim 12, further comprising the step of adding ammonia to the first copolymer to produce a pH of from 6 to 9.

15. The method according to claim 12, further comprising the step of mixing the first copolymer with a second copolymer to produce a copolymer blend.

16. A method of adhering two surfaces comprising applying a pressure-sensitive adhesive of claim 1 to at least a first surface and adhering a second surface to the first surface.

17. A pressure-sensitive adhesive, comprising:
    a first copolymer derived from monomers comprising a (meth)acrylate monomer and an acid monomer in an aqueous medium;
    wherein the aqueous medium includes ammonia to produce a pH of from 6 to 9,
    wherein the first copolymer is polymerized at a temperature of at least 150° C., and
    wherein the first copolymer has a weight average molecular weight of less than 10,000 Daltons.

18. A method of making a pressure-sensitive adhesive of claim 16, comprising:
    polymerizing monomers including a eth)acrylate monomer and an acid monomer in an aqueous medium, at a polymerization temperature of at least 150° C. to produce a first copolymer having a weight average molecular weight of less than 10,000 Daltons;
    adding ammonia to the aqueous medium to produce a pH of from 6 to 9; and
    preparing a pressure-sensitive adhesive from the first copolymer.

19. A pressure-sensitive adhesive, comprising:
    a first copolymer derived from monomers comprising a (meth)acrylate monomer and an acid monomer;
    wherein the monomers contain 0% by weight of a vinyl aromatic monomer,
    wherein the first copolymer is polymerized at a temperature of at least 150° C., and
    wherein the first copolymer has a weight average molecular weight of less than 10,000 Daltons.

20. A method of making a pressure-sensitive adhesive of claim 18, comprising:

polymerizing monomers including a (meth)acrylate monomer and an acid monomer, at a polymerization temperature of at least 150° C. to produce a first copolymer having a weight average molecular weight of less than 10,000 Daltons, wherein the monomers contain 0% by weight of a vinyl aromatic monomer; and preparing a pressure-sensitive adhesive from the first copolymer.

21. The pressure-sensitive adhesive according to claim 1, wherein the first copolymer has a number average molecular weight of 2,434 Daltons or less.

22. The pressure-sensitive adhesive according to claim 1, wherein the first copolymer is derived from 55% by weight or greater of the one or more (meth)acrylate monomers.

* * * * *